United States Patent [19]

Kohler

[11] Patent Number: 5,045,340

[45] Date of Patent: Sep. 3, 1991

[54] HARD CONFECTIONERY PRODUCTS CONTAINING MAINLY XYLITOL AND A PROCESS OF PREPARING SAME

[75] Inventor: Horst Kohler, Oulu, Finland

[73] Assignee: Oy Rettig Ab, Finland

[21] Appl. No.: 469,765

[22] Filed: Jan. 26, 1990

Related U.S. Application Data

[63] Continuation-in-part of Ser. No. 326,332, Mar. 21, 1989, abandoned.

[30] Foreign Application Priority Data

Nov. 22, 1988 [FI] Finland .................................. 885397
Nov. 4, 1989 [EP] European Pat. Off. ............ 89312063

[51] Int. Cl.$^5$ .............................................. A23G 3/00
[52] U.S. Cl. ..................................... 426/660; 426/658; 426/804
[58] Field of Search ............... 426/103, 658, 660, 548, 426/804

[56] References Cited

U.S. PATENT DOCUMENTS

| | | | |
|---|---|---|---|
| 3,914,434 | 10/1975 | Bohni ................................. | 426/548 |
| 4,154,867 | 5/1979 | Aldrich et al. ...................... | 426/660 |
| 4,311,722 | 1/1982 | Vink et al. .......................... | 426/660 |
| 4,497,846 | 2/1985 | Boursier et al. .................... | 426/660 |
| 4,692,339 | 9/1987 | Stetson et al. ...................... | 426/660 |
| 4,753,816 | 6/1988 | Vink .................................... | 426/660 |
| 4,789,559 | 12/1988 | Hirao et al. ......................... | 426/660 |

*Primary Examiner*—Jeanette Hunter
*Attorney, Agent, or Firm*—Finnegan, Henderson, Farabow, Garrett, & Dunner

[57] ABSTRACT

This invention relates to a hard confectionery composed of at least 45 to 65% by weight of xylitol and to a process of preparing said hard confectionery product by heating a mixture containing 5 to 20% by weight of xylitol, 85 to 70% by weight of maltitol or lactitol, less than 15% by weight of other sugar alcohols, and small amounts of water, to a temperature of from 170° to 175° C.; allowing the resulting melt to cool to a temperature ranging between 105° and 120° C.; subsequently rapidly adding to the melt 30 to 60% by weight of powdered xylitol, counted on the amount of the melt, while mixing carefully; and finally shaping the obtained mixture into a confectionery product.

6 Claims, No Drawings

HARD CONFECTIONERY PRODUCTS CONTAINING MAINLY XYLITOL AND A PROCESS OF PREPARING SAME

This application is a continuation-in-part of Ser. No. 07/326,332 filed Mar. 21, 1989, now abandoned.

The invention relates to hard confectionery products, such as sweets, containing mainly xylitol and a process of preparing such products.

Traditionally, hard sweets have been prepared by concentrating solutions containing mainly saccharose and glucose syrup to a low water content. The product so obtained has a "glass-like" structure. In this specification, the term "traditional structure" is intended to means such a glass-like (amorphous) structure, which can soften quietly in the mouth. Such structure results in a particular palatability, i.e. feeling in the mouth. Since both saccharose and glucose syrup are good sources of energy for bacteria causing dental caries, attempts have been made to replace such substances by more tooth-friendly substances, such as sorbitol and above all xylitol. However, it has proved difficult to prepare hard sweets containing a high amount of xylitol.

Finnish Patent 61 265 discloses a process of preparing hard sweets containing xylitol. In this prior art method, powdered xylitol is added to melted xylitol in an amount of 10 to 30% by weight, counted on the total amount of the confectionery material, at a temperature not greater than approximately the melting point of xylitol (96° C.). The resultant melt is poured into moulds and allowed to cool; thus the prior art process is not continuous. In addition, the prior art process is technically difficult and its industrial application has not been possible.

In one aspect the present invention provides a hard confectionery product having a traditional structure characterised in that it is mainly composed of xylitol.

In accordance with another aspect of the present invention it has also been found that hard confectionery products containing a high amount of xylitol can be produced by heating a mixture containing 5 to 20% by weight of xylitol, preferably 7 to 10% by weight of xylitol, 85 to 70% by weight of maltitol or lactitol, and less than 15% of other sugar alcohols, to a temperature of from 170° to 175° C.; by allowing the resultant melt to cool to a temperature ranging from 105° to 120° C., preferably from 110° to 115° C.; and by subsequently rapidly adding 30 to 60% by weight of powdered xylitol, preferably 35 to 55% by weight, counted on the amount of the melt, while mixing carefully, and shaping the resultant mixture into a confectionery product, such as a sweet. In addition, the process may be continuous.

The confectionery product according to the invention may contain 45 to 65% of xylitol, preferably 50 to 55%, and it can be flavoured by means of aromatic substances known per se in the preparation of confectionery preferably, the product has a xylitol coating.

The moulding machine may be a rolling machine, a filled-sweet production line, and a toffee, cutting and wrapping machine.

The maltitol is preferably derived from maltitol syrup such as "Finnmalt" or "Melida", but it is also possible to use crystalline maltitol, or sugar alcohol mixtures containing mainly maltitol, such as "Palatinit" and "Lycasin", which contain less than about 8% of sorbitol, 60 to 90% of maltitol, and 10 to 40% of other sugar alcohols.

The lactitol used is preferably a lactitol monohydrate or a lactitol dehydrate.

The addition and mixing of powdered xylitol can be carried out e.g. in a Z mixer or in an extruder mixer. The mixing should be effected rapidly (from 30 seconds to 2 minutes) and effectively; however, the temperature of the mixture should not exceed 90° C. during mixing.

The following non-limiting Examples illustrate the present invention.

EXAMPLE 1

A mixture containing 1280 g of maltitol syrup ("Finnmalt"; containing less than 8% of sorbitol, 60 to 65% of maltitol, and 30 to 35% of other sugar alcohols; dry substance content 75±1%; manufactuer Finnsugar Ltd, or the like) and 120 g of xylitol was heated to 175° C., whereafter it was cooled to 115° C. The humidity of the mixture was thereby 1.3%. At this point, 980 g of powdered xylitol %nd 4 ml of mint aroma were added rapidly to the mixture while mixing carefully; the temperature of the resulting mixture was about 62° C. The mixture was allowed to cool to about 40° C., whereafter the mass was shaped in a cold rolling machine, and wrapped.

EXAMPLE 2

A mixture containing 700 g of maltitol and 200 g of xylitol and small amounts of water was heated to 170° C., whereafter the mixture was cooled to 112° C. Thereby the humidity of the mixture was 1.3%. At this point, 1100 g of powdered xylitol and 4 ml of mint aroma were added rapidly to the mixture while mixing carefully, the temperature of the resulting mixture being maintained below 65° C. Thereafter the mixture was cooled to about 42° C., and the mass was shaped in a cold rolling machine and the shaped product was wrapped.

EXAMPLE 3

A mixture containing 700 g of lactitol and 200 g of xylitol and small amounts of water was heated to 170° C., whereafter the mixture was cooled to 112° C. Thereby the humidity of the mixture was 1.3%. At this point, 1100 g of powdered xylitol and 4 ml of mint aroma were added rapidly to the mixture while mixing carefully, the temperature of the resulting mixture being maintained below 65° C. Thereafter the mixture was cooled to about 42° C., and the mass was shaped in a cold rolling machine and the shaped product was wrapped.

EXAMPLE 4

The shaped product obtained as described in Example 1, 2 or 3, was coated before wrapping.

In a coating vessel, the product was treated at 75° C. with a xylitol syrup (the syrup was prepared by mixing 16.5 kg xylitol and 7.3 l water at 120° C. and by adding a gum arabicum solution (50% gum arabicum and 50% water; 70° C.) as well as colours and aromas). Xylitol powder was added, whereby hard dragees were obtained. This coating step was repeated twice. After drying and glossing the product was wrapped.

I claim:

1. A process of preparing a hard confectionery product mainly composed of xylitol, which process comprises heating a mixture containing from 5 to 20% by weight of xylitol, from 85 to 70% by weight of maltitol, less than 15% by weight of other sugar alcohols, and a small amount of water, to a temperature of from 170° to 175° C., to form a melt; allowing the resulting melt to cool to a temperature ranging from 105° to 120° C.; subsequently rapidly adding to the melt with mixing from 30 to 60% by weight of powdered xylitol, based upon the amount of the melt; and finally shaping the obtained mixture into a confectionery product.

2. The process according to claim 1 wherein said mixture contains from 7 to 10% by weight of xylitol, from 80 to 75% by weight of maltitol, less than 15% by weight of other sugar alcohols, and a small amount of water,; the resulting melt is cooled to a temperature from 110° to 115° C.; 35 to 55% by weight of powdered xylitol, based upon the amount of the melt is rapidly added to the melt, while mixing, in an extruder mixer; and the obtained mixture is cooled to a temperature below 96° C. and shaped into a confectionery product.

3. A process of preparing a hard confectionery product mainly composed of xylitol, which process comprises heating a mixture containing from 5 to 20% by weight of xylitol, from 85 to 70% by weight of lactitol, less than 15% by weight of other sugar alcohols, and a small amount of water, to a temperature of from 170° to 175° C. to form a melt; allowing the resulting melt to cool to a temperature ranging from 105° to 120° C.; subsequently rapidly adding to the melt with mixing from 30 to 60% by weight of powdered xylitol, based upon the amount of the melt; and finally shaping the obtained mixture into a confectionery product.

4. The process according to claim 3, wherein said mixture contains from 7 to 10% by weight of xylitol, from 80 to 75% by weight of lactitol, less than 15% by weight of other sugar alcohols, and a small amount of water 35 to 55% by weight of powdered xylitol, based upon the amount of the melt, is rapidly added to the melt while mixing in an extruder mixer; and the obtained mixture is cooled to a temperature below 96° C. and shaped into a confectionery product.

5. A hard xylitol confection produced by the process of claim 1.

6. The confection of claim 5 having a coating thereon.

* * * * *

UNITED STATES PATENT AND TRADEMARK OFFICE
CERTIFICATE OF CORRECTION

PATENT NO. : 5,045,340

DATED : September 3, 1991

INVENTOR(S) : Horst Kohler

It is certified that error appears in the above-identified patent and that said Letters Patent is hereby corrected as shown below:

Title page, Priority Data, change "Nov. 4, 1989" to --Nov. 21, 1989--.

Claim 1, column 3, line 2, after "°C." delete ",".

Claim 2, column 3, line 12, after "water" delete ",".

Claim 2, column 3, line 14, after "melt" insert --,--.

Claim 4, column 4, line 12, before "35" insert --; allowing the resulting melt to cool to a temperature from 110° to 115°C; and--.

Signed and Sealed this

Twenty-third Day of February, 1993

Attest:

STEPHEN G. KUNIN

Attesting Officer

Acting Commissioner of Patents and Trademarks